" 
US008635075B2

(12) United States Patent
Andrew

(10) Patent No.: US 8,635,075 B2
(45) Date of Patent: *Jan. 21, 2014

(54) RAISING THE VISIBILITY OF A VOICE-ACTIVATED USER INTERFACE

(75) Inventor: Felix Andrew, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 398 days.

This patent is subject to a terminal disclaimer.

(21) Appl. No.: 12/577,292

(22) Filed: Oct. 12, 2009

(65) Prior Publication Data
US 2010/0031150 A1    Feb. 4, 2010

Related U.S. Application Data

(63) Continuation of application No. 11/251,736, filed on Oct. 17, 2005, now Pat. No. 7,624,019.

(51) Int. Cl.
*G10L 21/00* (2013.01)
*G10L 21/06* (2013.01)

(52) U.S. Cl.
USPC ........ 704/275; 704/276; 704/270.1; 704/270; 704/251

(58) Field of Classification Search
USPC ............... 704/275, 270.1, 251, 276, 270; 715/700, 728; 705/700, 728
See application file for complete search history.

(56) References Cited

U.S. PATENT DOCUMENTS

| 6,173,260 | B1 * | 1/2001 | Slaney ................... 704/250 |
| 6,233,560 | B1 * | 5/2001 | Tannenbaum ........... 704/275 |
| 6,446,135 | B1 * | 9/2002 | Koppolu et al. ......... 719/313 |
| 6,456,978 | B1 * | 9/2002 | Wymore et al. .......... 704/275 |
| 6,882,974 | B2 | 4/2005 | James et al. ............ 704/270.1 |
| 6,937,984 | B1 * | 8/2005 | Morgan et al. .......... 704/270 |
| 7,062,437 | B2 * | 6/2006 | Kovales et al. .......... 704/260 |
| 7,136,814 | B1 * | 11/2006 | McConnell ............ 704/246 |
| 7,213,206 | B2 * | 5/2007 | Fogg ..................... 715/706 |
| 7,218,311 | B2 * | 5/2007 | Akins ..................... 345/168 |
| 7,483,833 | B2 * | 1/2009 | Peters .................... 704/270 |
| 7,519,534 | B2 * | 4/2009 | Maddux et al. ......... 704/255 |
| 7,620,553 | B2 * | 11/2009 | Wang et al. ............. 704/275 |
| 8,109,765 | B2 * | 2/2012 | Beattie et al. ........... 434/178 |
| 2002/0054136 | A1 | 5/2002 | Andrew et al. .......... 345/800 |
| 2002/0059073 | A1 | 5/2002 | Zondervan et al. ...... 704/270.1 |
| 2002/0110248 | A1 * | 8/2002 | Kovales et al. .......... 381/56 |
| 2002/0128762 | A1 * | 9/2002 | Noguchi et al. ......... 701/51 |
| 2004/0179667 | A1 * | 9/2004 | Belcea ................... 379/207.12 |
| 2006/0059425 | A1 * | 3/2006 | Anspach et al. ......... 715/713 |
| 2006/0119615 | A1 | 6/2006 | Zhou et al. .............. 345/619 |
| 2007/0174043 | A1 * | 7/2007 | Makela ................... 704/4 |
| 2007/0273637 | A1 | 11/2007 | Zhou et al. .............. 345/107 |

* cited by examiner

*Primary Examiner* — Pierre-Louis Desir
*Assistant Examiner* — Abdelali Serrou
(74) *Attorney, Agent, or Firm* — Kelly, Holt & Christenson PLLC

(57) ABSTRACT

A system is configured to enable a user to assert voice-activated commands. When the user issues a non-ambiguous command, the system activates a corresponding control. The area of activity on the user interface is visually highlighted to emphasize to the user that what they spoke caused an action. In one specific embodiment, the highlighting involves floating text the user uttered to a visible user interface component.

18 Claims, 13 Drawing Sheets

RAISING THE VISIBILITY OF A VOICE-ACTIVATED USER INTERFACE

CROSS-REFERENCE TO RELATED APPLICATION

The present application is a continuation application of and claims priority of U.S. patent application Ser. No. 11/251,736, filed Oct. 17, 2005, the content of which is hereby incorporated by reference in its entirety.

BACKGROUND OF THE INVENTION

Some computer systems are configured to support voice-activated command and control. For example, some systems are configured such that when a user speaks a non-ambiguous command, the system recognizes the command and supports activation of a corresponding control. In this manner, a user can use voice commands to navigate through the system environment, for example, through various user interface components associated with a software application.

In some cases, it will not be very apparent to the user that what they just spoke actually effectuated control within the framework of the system or application. For example, it may not be apparent to the user that any action was taken at all. Similarly, it may not be apparent that an application state has changed.

In some instances, a user can become lost or confused if a command is spoken with an expectation that a particular control will be effectuated but the system is configured to activate a different control. For example, a user might say "open file" with an expectation that a folder appearing on a desktop will be opened. Contrary to the user's expectation, however, the system may be configured to open a drop-down menu under a "FILE" designator that appears on the same desktop. The nature of this inconsistency of expectations may not be immediately apparent to the user.

The discussion above is merely provided for general background information and is not intended for use as an aid in determining the scope of the claimed subject matter.

SUMMARY OF THE INVENTION

A system is configured to enable a user to assert voice-activated commands. When the user issues a non-ambiguous command, the system activates a corresponding control. The area of activity on the user interface is visually highlighted to emphasize to the user that what they spoke caused an action. In one specific embodiment, the highlighting involves floating text the user uttered to a visible user interface component.

This Summary is provided to introduce a selection of concepts in a simplified form that are further described below in the Detailed Description. This Summary is not intended to identify key features or essential features of the claimed subject matter, nor is it intended for use as an aid in determining the scope of the claimed subject matter.

DETAILED DESCRIPTION OF ILLUSTRATIVE EMBODIMENTS

Figure 1:
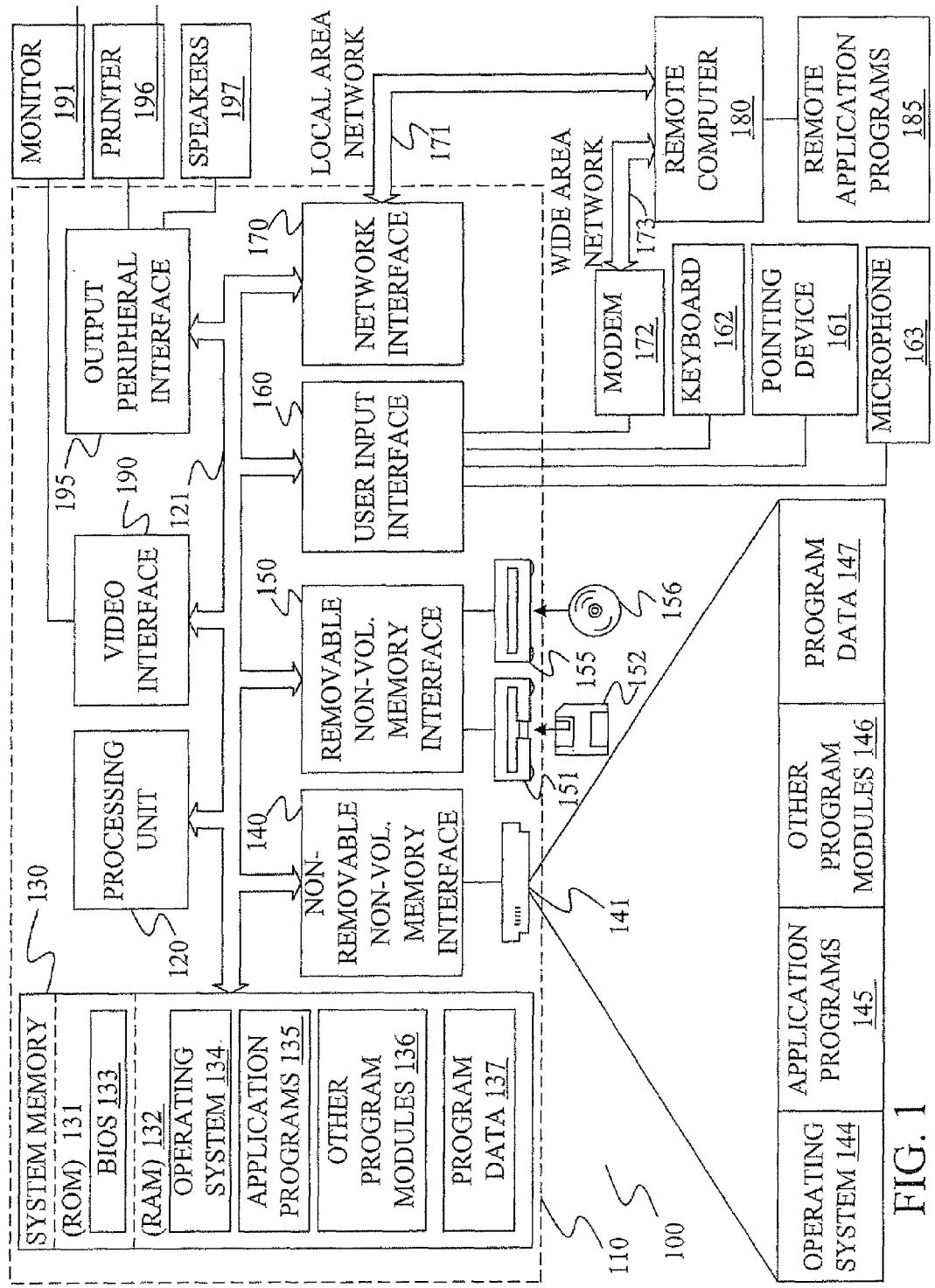
FIG. 1 is a block diagram of one computing environment in which some embodiments may be practiced.

FIG. 1 illustrates an example of a suitable computing system environment 100 on which embodiments may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing some embodiments includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

A computer system is illustratively configured to enable a user to assert voice-activated commands. When the user issues a non-ambiguous command, the system activates a corresponding control. The area of activity on the user interface is visually highlighted to emphasize to the user that what they spoke caused an action.

FIGS. 2A-2E are a progressive series of diagrammatic illustrations demonstrating one option for accomplishing visual highlighting of a voice-activated command in the context of a music player software application. The series of Figures depicts a computer system 200 that includes a monitor 202, a microphone 204, a mouse 208 and a keyboard 206. The display area within monitor 202 shows an application user interface 214, a music player user interface 212 and a speech support application user interface 210.

Interface 210 is illustratively associated with an application that supports voice-activated command and control. Interface 212 is illustratively associated with an application that supports an ability to play music from a compact disc. Interface 214 is illustratively associated with any of a variety of applications that include, as illustrated, a file menu, an edit menu and a view menu.

Figure 2A:
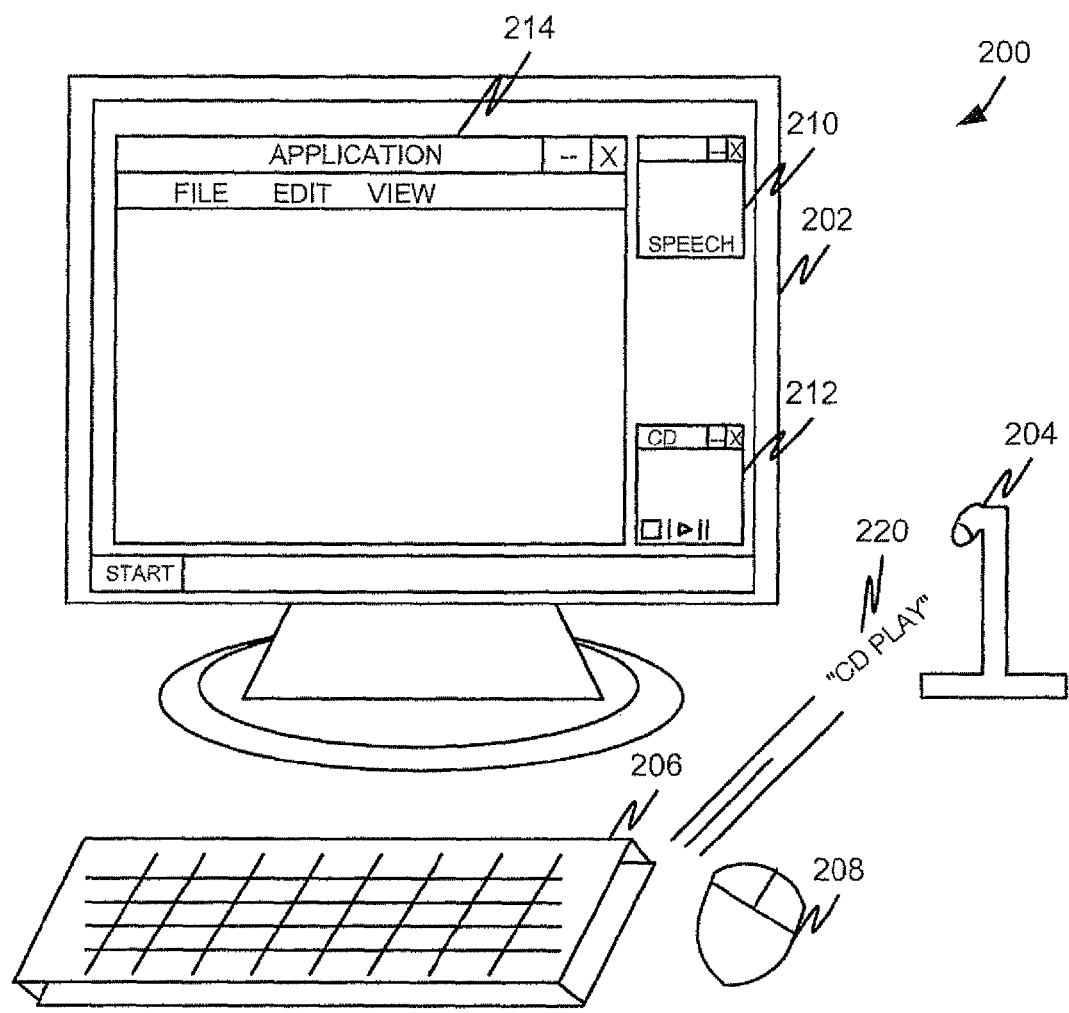
FIGS. 2A-2E are a series of diagrammatic illustrations demonstrating a visual representation of a voice-activated command in the context of a music player.

A user illustratively says the words "CD PLAY" into microphone 204. In FIG. 2A, this action is shown as speech input 220. Speech input 220 is digitized and translated by a speech recognition engine into a user command that represents a request by the user to cause application 212 to play a currently loaded CD.

Figure 2B:
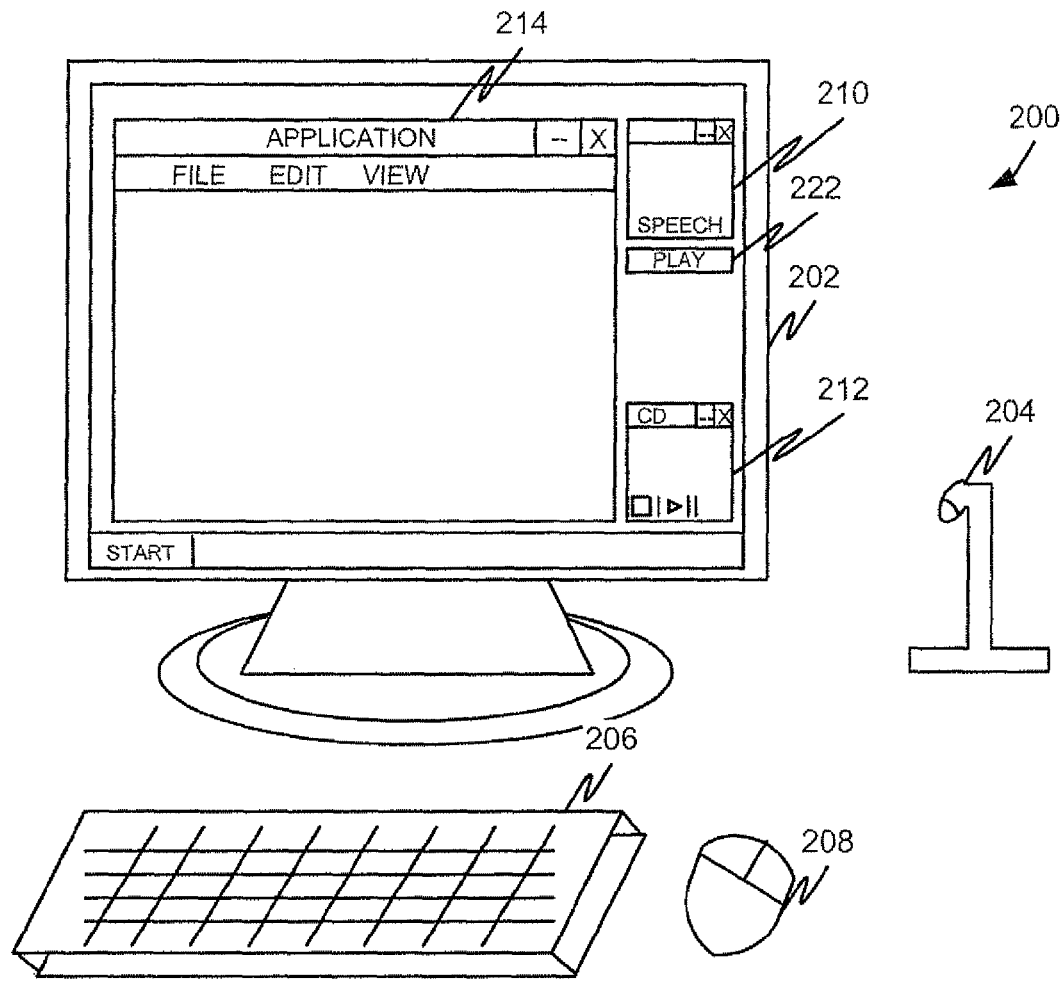

A visual representation of the user's spoken command is generated. This is shown in FIG. 2B as user interface component 222. Illustratively, component 222 first appears from within, or proximate to, application interface 210. Alternatively, component 222 can originate from elsewhere (e.g., from the illustrated START menu icon, from a corner, from a relatively uncluttered portion of the display, etc.). Further, component 222 need not necessarily be implemented as the illustrated block containing a word-based representation of the spoken command. The visible implementation can be words without the illustrated block boundary. Alternatively, component 222 can incorporate a symbol instead of a word or words. Those skilled in the art will appreciate that there are many obvious alternatives that should be considered within the scope of the present invention.

Figure 2C:
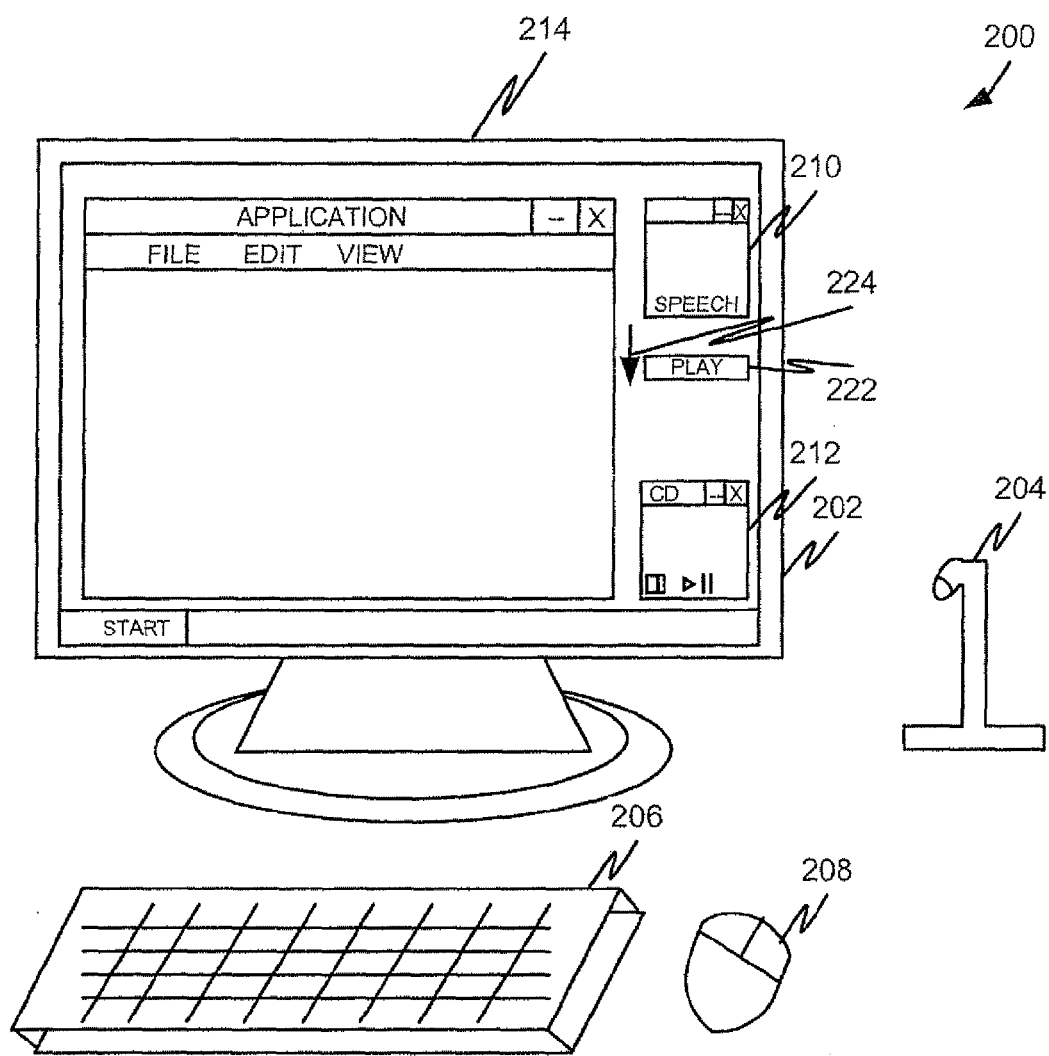
Figure 2D:
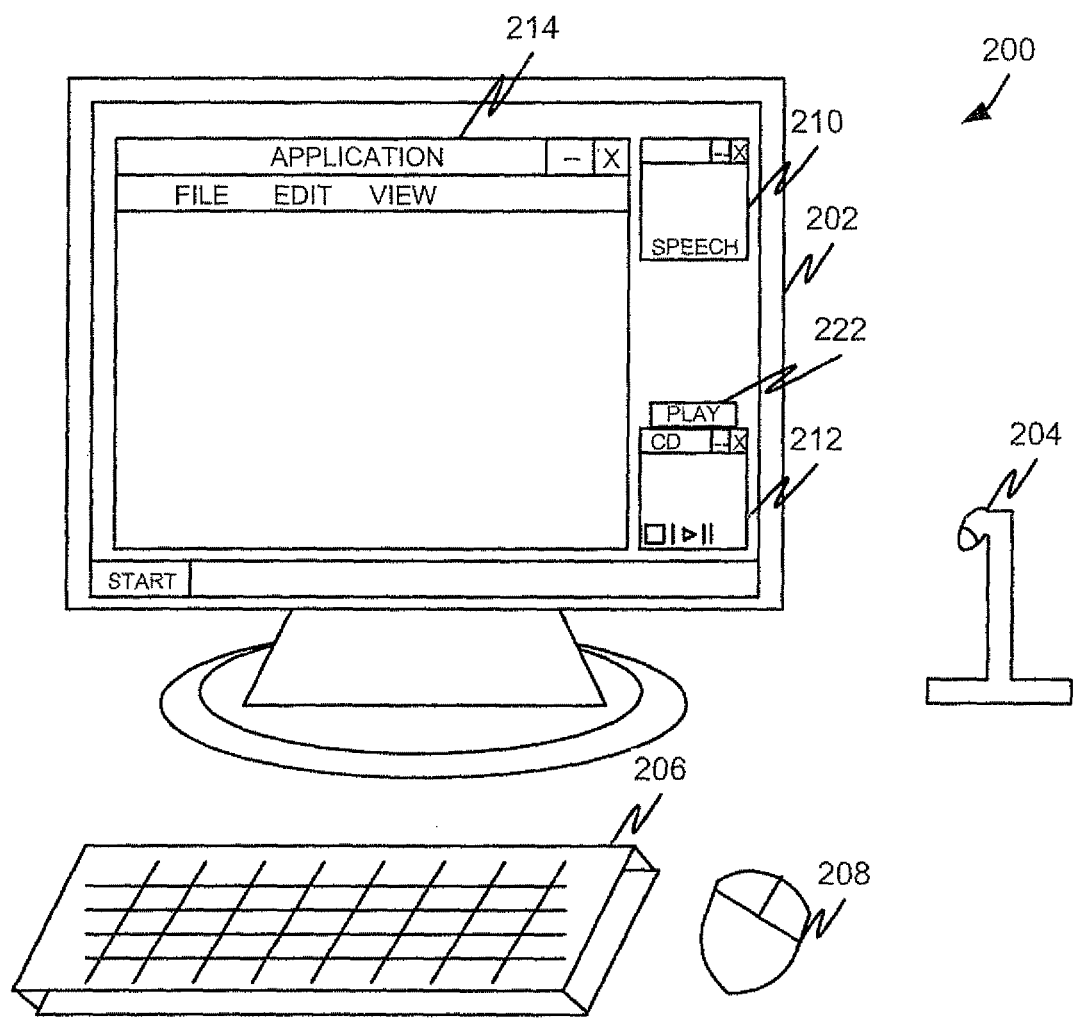
Figure 2E:
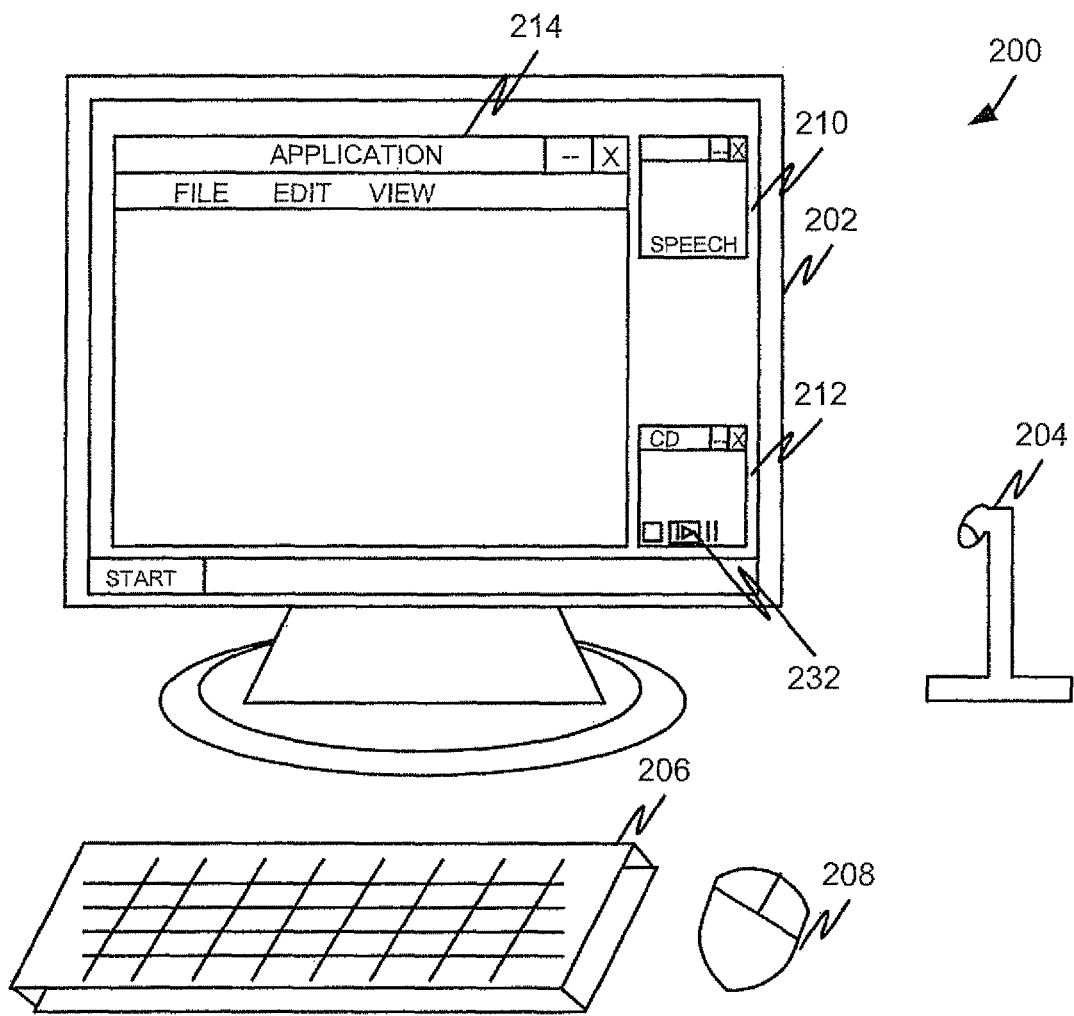

As is indicated in FIG. 2C by arrow 224, the user interface component 222 moves away from application interface 210 and toward application interface 212. As is indicated in FIG. 2D, user interface component 222 continues to move until it approaches or contacts application interface 212. As is indicated in FIG. 2E, component 222 has now disappeared and has been replaced by a visual emphasis 232 of the play button. In one embodiment, user interface component does not stop at the border of application interface 212 but instead goes all the way to the play button itself.

It should be noted that it is within the scope of the present invention for there to be visible continuity from the time that component 222 first appears to the time that the component disappears. In other words, the series of FIGS. 2A-2E do not capture the fact that user interface component 222 may not obviously appear and re-appear during the transition from initial appearance to final disappearance.

It should be emphasized that there are many variations that should be considered within the scope of the present invention. For example, user interface component 222 can be configured to pause at its final destination before disappearing. In another example, inter interface component 222 can change sizes during its period of existence (e.g., start small and grow larger as destination is approached). In another example, the path from source to destination may not necessarily be direct (e.g., component 222 could corkscrew in until the destination is reached). These are just example of many potential similar variations.

FIGS. 3A-3F are a progressive series of diagrammatic illustrations demonstrating another option for accomplishing visual highlighting of a voice-activated command in the context of a file menu function that is operational from within an application user interface. The series of Figures depicts a computer system 300 that includes a monitor 302, a microphone 304, a mouse 308 and a keyboard 306. The display area within monitor 302 shows an application user interface 314, a music player user interface 312 and a speech support application user interface 310.

Interface 310 is illustratively associated with an application that supports voice-activated command and control. Interface 312 is illustratively associated with an application that supports an ability to play music from a compact disc. Interface 314 is illustratively associated with any of a variety of applications that include, as illustrated, a file menu, an edit menu and a view menu.

Figure 3A:
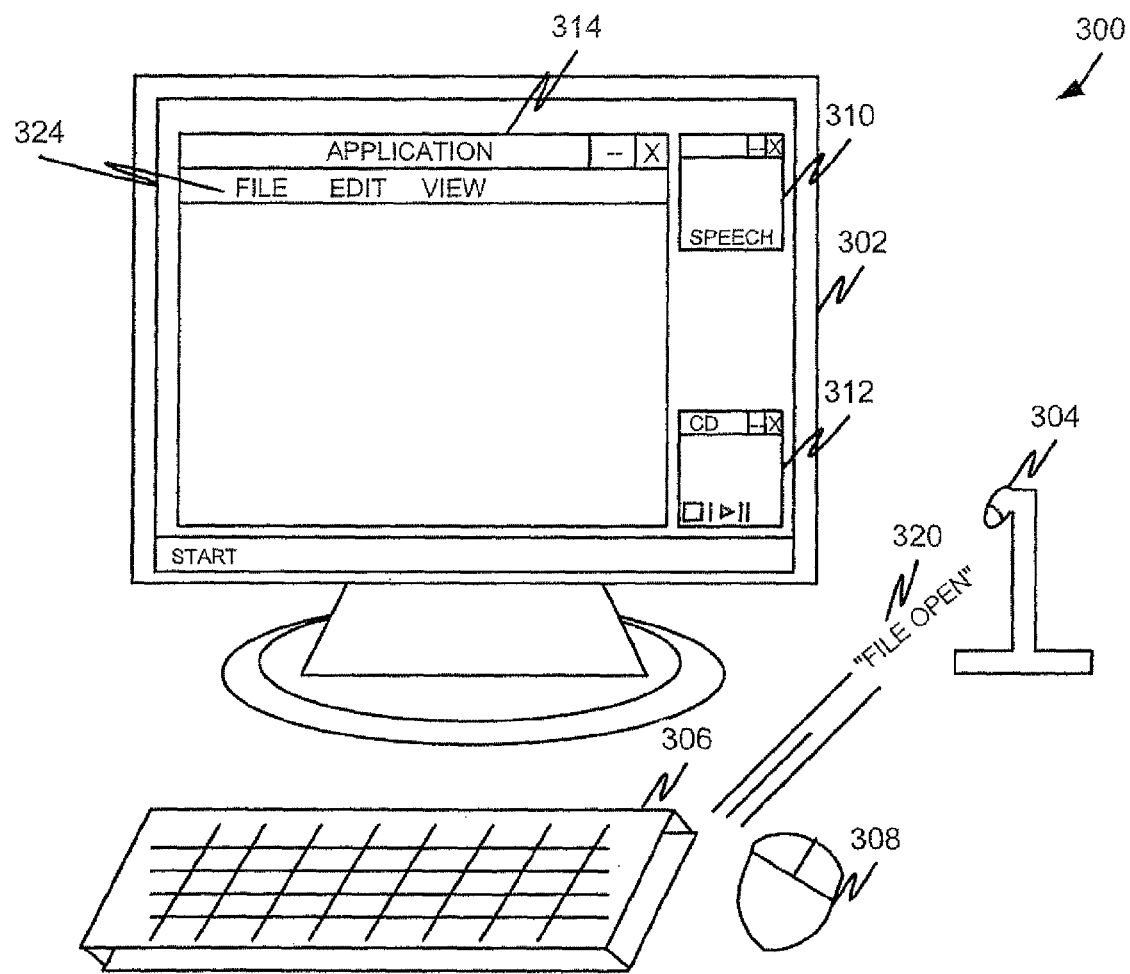
FIGS. 3A-3F are a series of diagrammatic illustrations demonstrating a visual representation of a voice-activated command in the context of a file menu.

A user illustratively says the words "FILE OPEN" into microphone 304. In FIG. 3A, this action is shown as speech input 320. Speech input 320 is digitized and translated by a speech recognition engine into a user command that represents a request by the user to access display options associated with a file menu icon 324 associated with application interface 314.

Figure 3B:
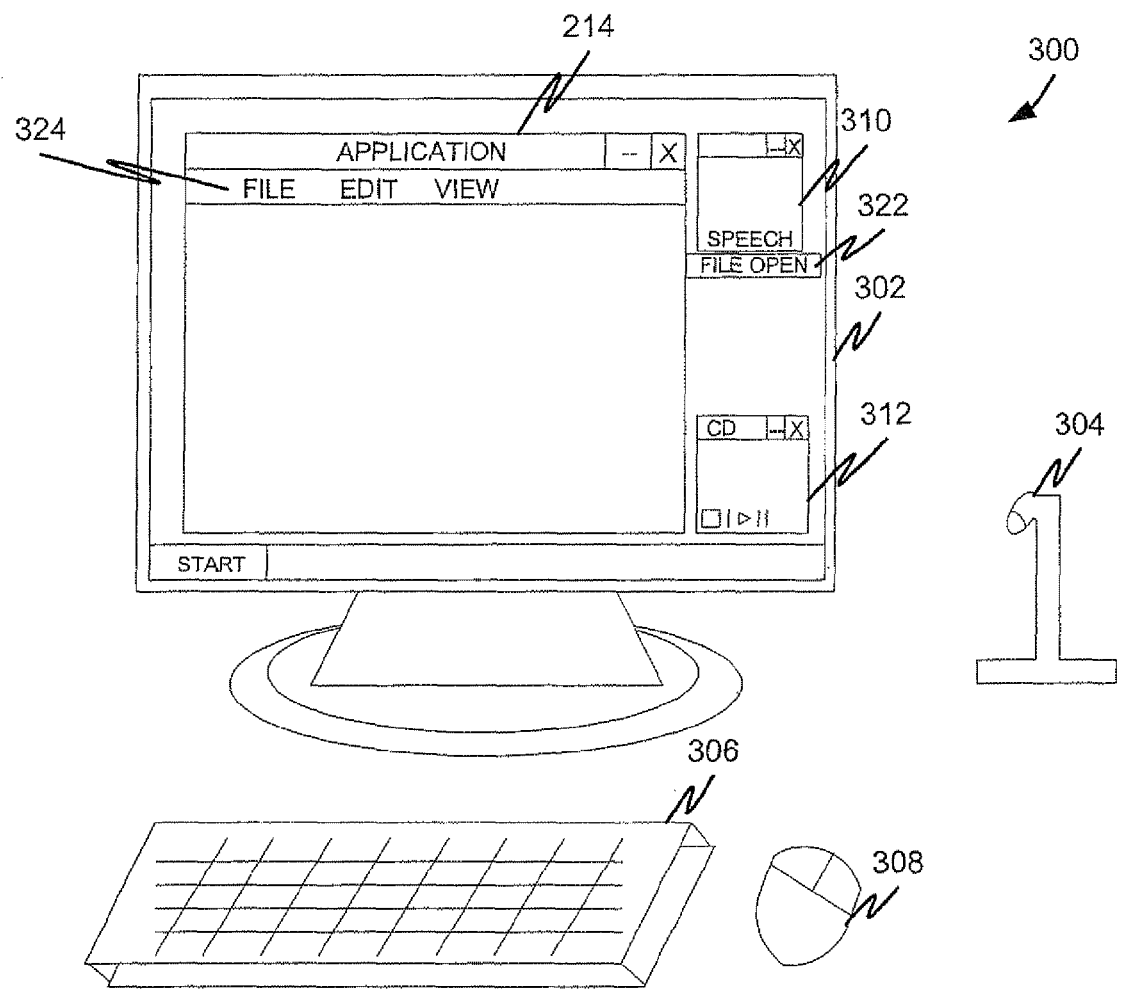

A visual representation of the user's spoken command is generated. This is shown in FIG. 3B as user interface component 322. Illustratively, component 322 first appears from within, or proximate to, application interface 310. Alternatively, component 322 can originate from elsewhere (e.g., from the illustrated START menu icon, from a corner, from a relatively uncluttered portion of the display, etc.). Further, component 322 need not necessarily be implemented as the illustrated block containing a word-based representation of the spoken command. The visible implementation can be words without the illustrated block boundary. Alternatively, component 322 can incorporate a symbol instead of a word or words. Those skilled in the art will appreciate that there are many obvious alternatives that should be considered within the scope of the present invention.

Figure 3C:
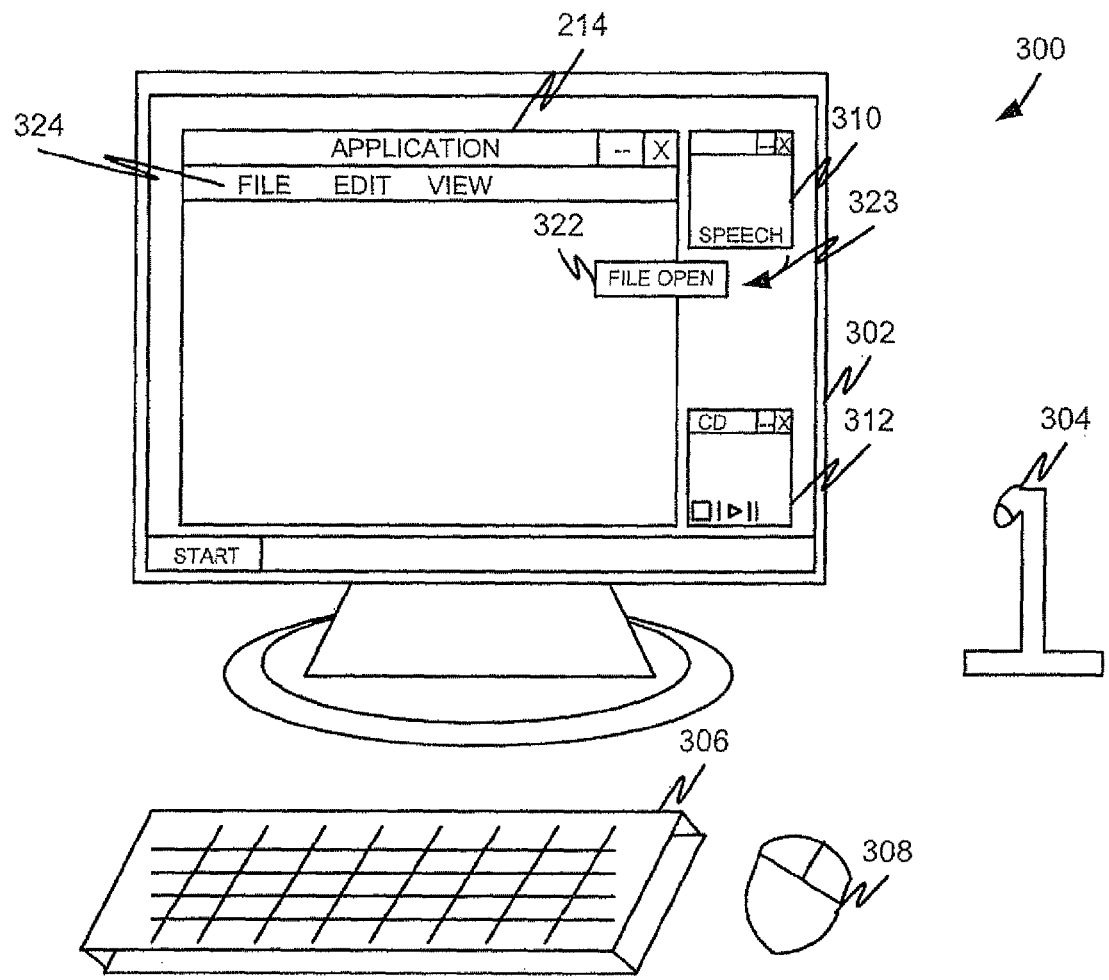
Figure 3D:
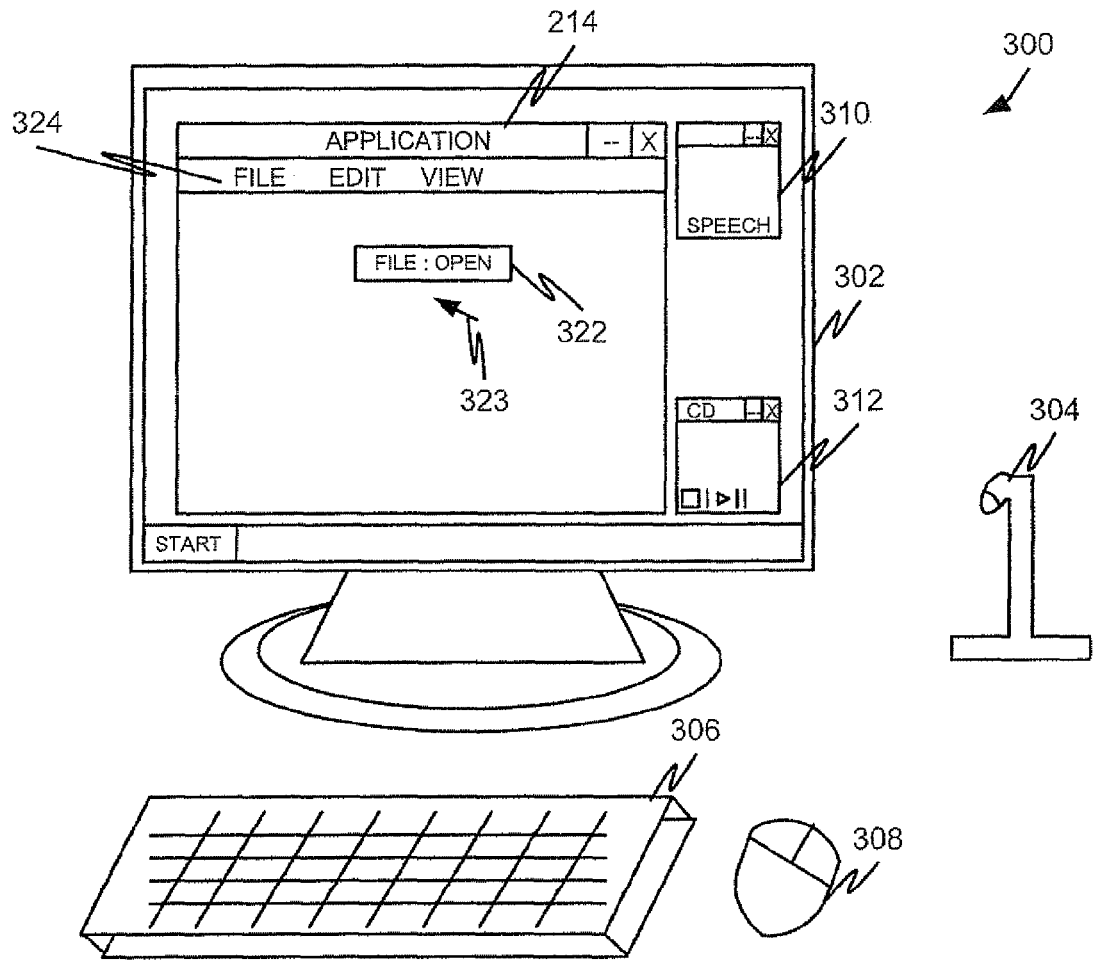
Figure 3E:
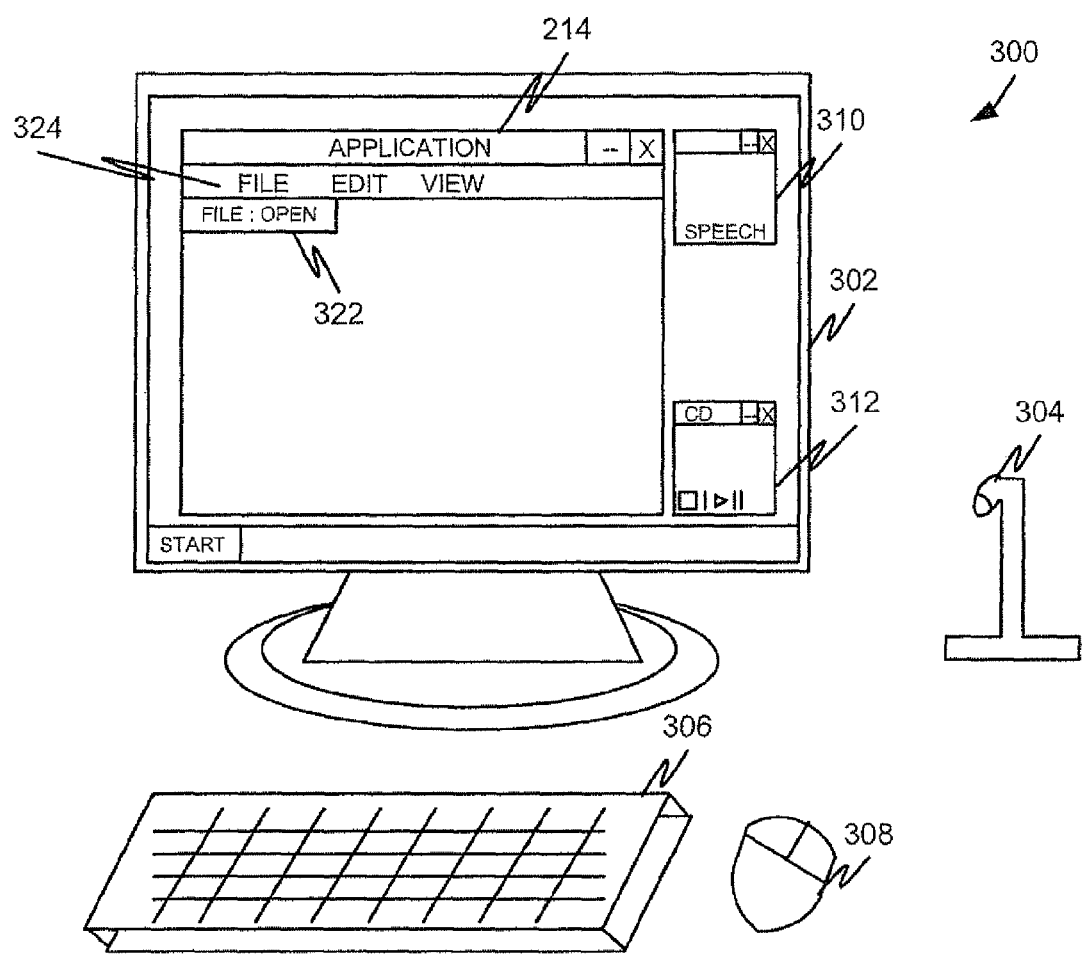
Figure 3F:
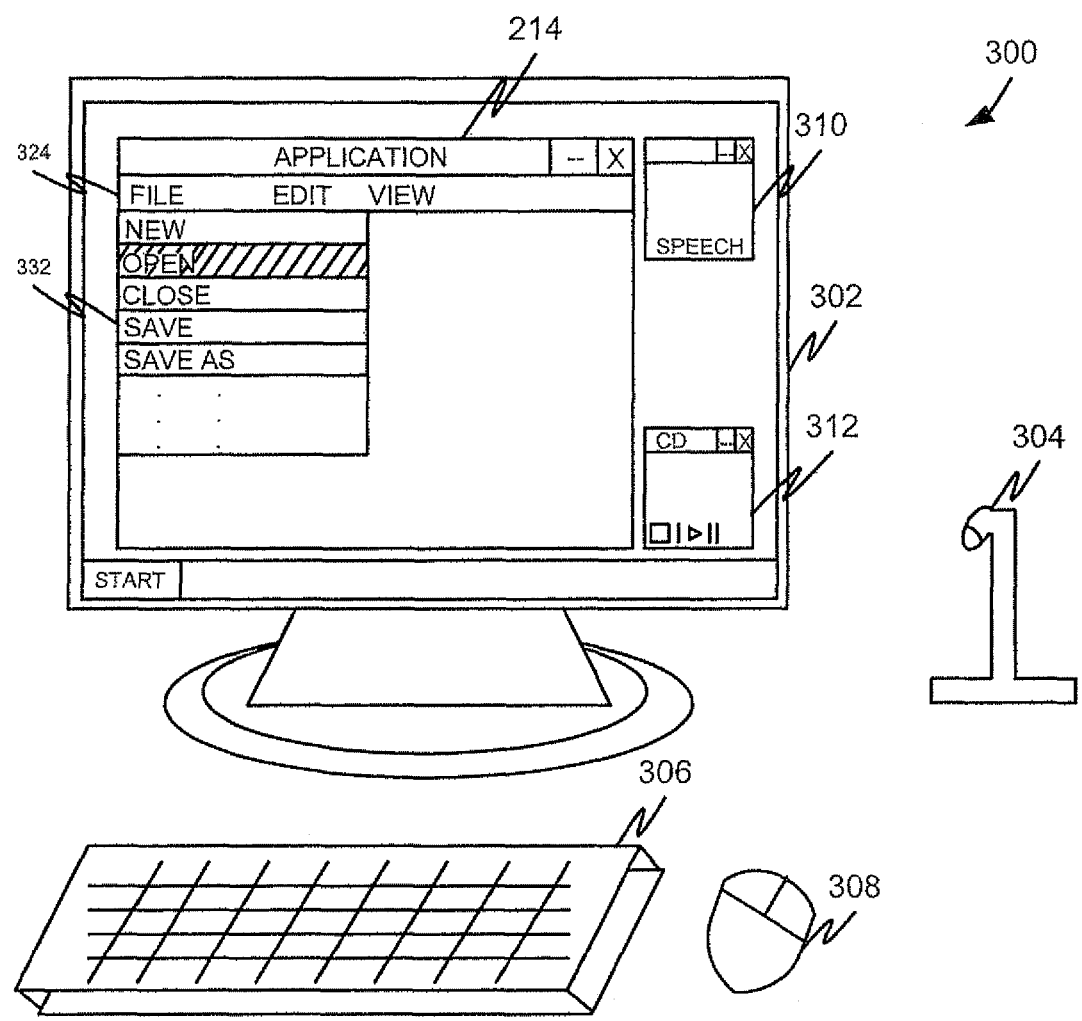

As is indicated in FIGS. 3C and 3D by arrow 323, the user interface component 322 moves away from application interface 310 and toward file menu indicator 324. As is suggested by FIG. 3E, user interface component 322 continues to move until it approaches or contacts file menu indicator 324. As is indicated in FIG. 3F, component 322 has now disappeared and has been replaced by file menu 332. In one embodiment, user interface component 322 does not go all the way to the file menu indicator itself but instead stops at the border of application interface 314.

It should be noted that it is within the scope of the present invention for there to be visible continuity from the time that component 322 first appears to the time that the component disappears. In other words, the series of FIGS. 3A-3F do not capture the fact that user interface component 322 may not obviously appear and re-appear during the transition from initial appearance to final disappearance. It should again be emphasized that there are many variations that should be considered within the scope of the present invention. Several example variations were described above in the context of the FIG. 2 example.

Figure 4:
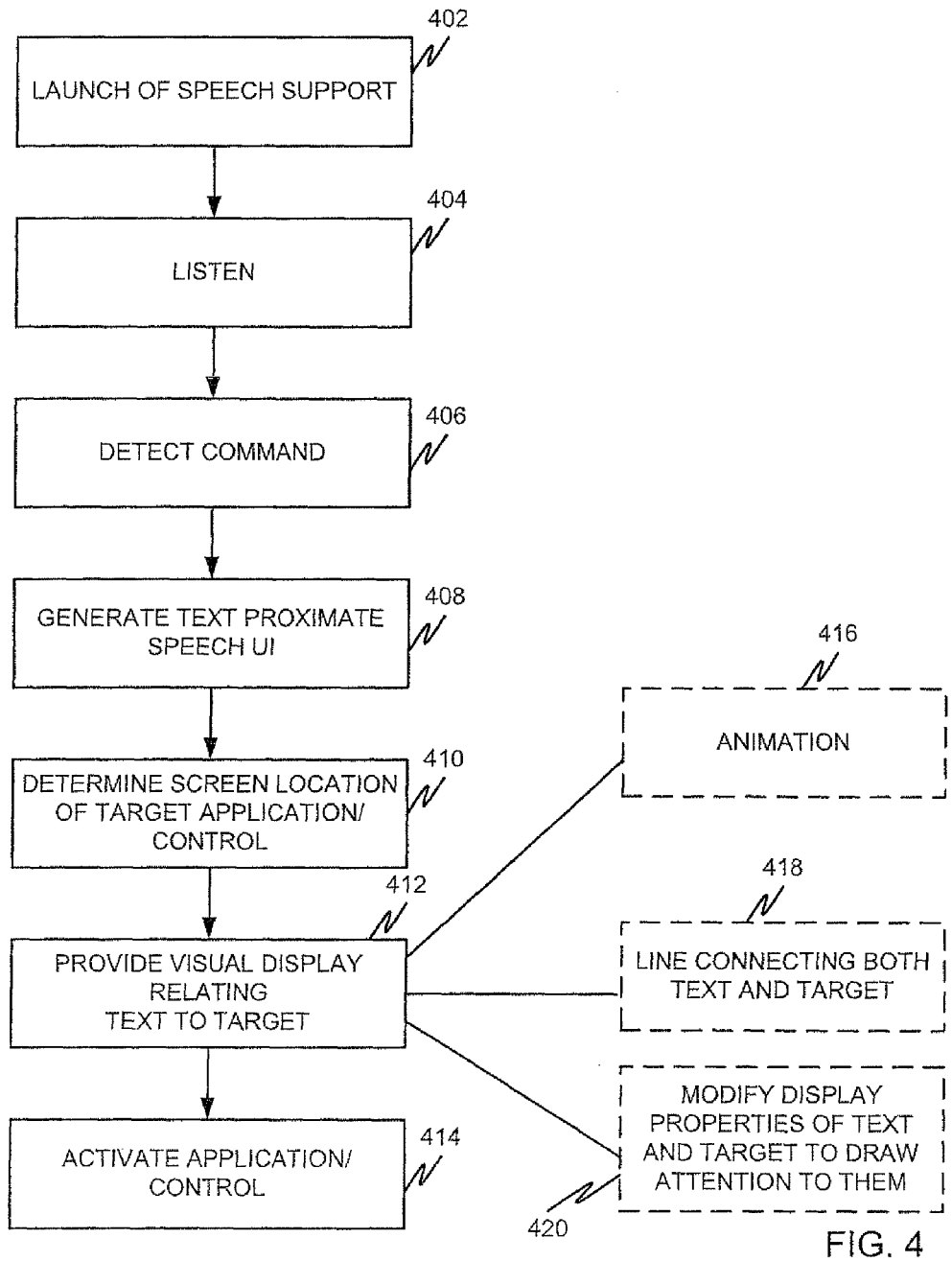
FIG. 4 is a block flow diagram illustrating steps associated with raising the visibility of a voice-activated user interface.

FIG. 4 is a block flow diagram illustrating a broad set of example steps associated with raising the visibility of a voice-activated user interface. In accordance with block 402, support for voice-activated command and control is launched. In accordance with block 404, the system is configured to monitor for voice input from a user. In accordance with block 406, when voice input is received, it is processed to determine when a voice-activated command has been received. In accordance with bock 408, a visible indication of text associated with a received command is generated and displayed proximate a user interface component associated with a speech application. As was mentioned in reference to other Figures, the visible indication could just as easily originate from elsewhere on the display (there may not even be a user interface component associated with a speech application).

In accordance with block 410, a determination is made as to where on the display there is a user interface component associated action to be conducted in association with the received voice-activated command. In accordance with block 412, a visual display is provided in order to visibly associate the generated command text with the target user interface component. Finally, in accordance with block 414, the action or function associated with the target user interface component is activated or executed.

It should be noted that the scope of the present invention extends to a range of methods for visibly associating a visible representation of a spoken command with a visible representation of action to be taken in association with the command. As is indicated in FIG. 4 by block 416, any kind of animation can be utilized to make the connection. The floating text examples providing herein are just examples of appropriate animations. As is indicated by block 418, a visible line connecting the command text to an appropriate representation of action can be utilized to make the association. As is indicated by block 420, another alternative is to modify display properties of the command text and/or representation of action to draw user's attention. For example, the text and/or representation of action might become expanded in size, underlined, glow, etc. Those skilled in the art will appreciate that all similar variations should also be considered within the scope of the present invention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for raising the visibility of a voice-activated user interface, the method comprising:

receiving a voice input from a user; processing the voice input to determine a voice-activated command associated with the voice input;

utilizing a computer processor that is a component of the computer to generate a visual representation of the received voice input;

displaying, in response to receiving the voice input, the visual representation of the received voice input on a display that is another component of the computer; determining a first target application that is associated with the voice input; utilizing the computer processor to generate a visual representation of a user interface element of the first target application;

displaying, on the display simultaneously with the visual representation of the received voice input, said visual representation of the user interface element of the first target application;

providing, on the display, a display feature that visually relates the visual representation of the received voice input to said visual representation of the user interface element of the first target application; displaying a set of actions within the user interface element of the first target application; visually highlighting an action within the set of actions that corresponds to the received voice input;

receiving a second voice input from the user; displaying a visual representation of the received second voice input on the display; determining a second target application that is associated with the second voice input, the first and the second target applications being different from one another and being displayed simultaneously on the display; and providing, on the display, another display feature that visually relates the visual representation of the received second voice input to a visual representation of another user interface element that is associated with the second voice input and the second target application, wherein providing said display feature comprises rendering, on the display, a visible line, wherein the second target application has multiple selectable functions for processing a media file, and wherein the second voice input corresponds to one of the multiple selectable functions, and wherein one end of the line overlaps or is adjacent to the visual representation of the received voice input and the other end of the line overlaps or is immediately adjacent to the visual representation of the user interface element, and wherein the visual representation of the received voice input includes a movable block having a word-based representation of the voice input.

2. The method of claim 1, wherein displaying the visual representation of the received voice input on the display comprises manipulating the visual representation of the received voice input such that the visual representation of the received voice input appears to originate from a speech application component, wherein the speech application component is rendered on the display in conjunction with an identifier that visually identifies the speech application component as being connected to speech-recognition functionality, and wherein the visually highlighted action appears at approximately a same time that the visual representation of the received voice input disappears.

3. The method of claim 2, wherein manipulating the visual representation further comprises manipulating such that said visual representation of the received voice input appears to originate from a standard location on the display from which other visual representations of other received voice inputs also appear to originate, wherein the standard location is, on the display, separated by distance from any visual representation of controls connected to functionality for executing commands associated with the voice inputs, and wherein displaying the set of actions comprises displaying a file menu having a list of operations that can be performed relative to a file.

4. The method of claim 1, further comprising modifying display properties of one of, or the other of, or both of, said visual representation of the received voice input and the visual representation of the user interface element of the first target application, and wherein the first target application is associated with textual files and the second target application is associated with media files.

5. The method of claim 1, wherein the visible line is positioned between the visual representation of the voice input and the visual representation of the user interface element, and wherein the multiple selectable functions include stop, play, and pause functions.

6. The method of claim 1, wherein the visible line is positioned so as to visually infer a connection between the visual representation of the received voice input and the visual representation of the user interface element, and wherein the one of the multiple selectable functions is visually highlighted on the display.

7. The method of claim 1, further comprising temporarily modifying display properties of both of the visual representation of the received voice input and the visual representation of the user interface element, and wherein both the voice input and the second voice input include a noun and a verb, the noun identifying an item, and the verb identifying an action to take on the item.

8. A user interface system for raising visibility of voice-activated command and control, the user interface system comprising:

a speech support user interface element that is associated with an application that supports the voice-activated command and control;

a visible representation of a voice-activated command, the visible representation of the voice-activated command originating from an area proximate to the speech support user interface element and including text indicative of words recognized from within the voice-activated command;

a visible representation of action to be taken in response to the voice-activated command to the visible representation of action having multiple appearances, the one of the appearances that is utilized in a given situation being dependent upon which one of a plurality of different applications that the voice-activated command corresponds to;

a visible association that relates said visible representation of the voice-activated command to the visible representation of action to be taken, the visible association comprising a line positioned between said visible representation of the voice-activated command and the visible representation of action to be taken so as to visually infer a connection between said visible representation of the voice-activated command and said visible representation of action to be taken, one end of the line overlapping or being adjacent to the visible representation of the voice activated command and the other end of the line overlapping or being immediately adjacent to the visible representation of action to be taken; and a computer processor that is a component Of a computing device, the computer processor rendering, simultaneously on an output display that is also a component of the computing device, the speech support user interface element, the visible representation of the voice-activated command, said visible representation of action to be taken, and the visible association, the visible representation of action to be taken being displayed in a window of an application that is associated with the action to be taken, the visible representation of the voice-activated command and the speech support user interface element being displayed outside of the window of the application, and the visible association being displayed both within the window of the application and the outside of the window of the application, the computer processor generating and displaying the visible representation of the action to be taken based upon receipt of the voice-activated command such that the visible representation of the action to be taken appears after the voice-activated command has been received, the visible representation of the action to be taken maintaining a visual continuity from a time it appears to a time it disappears, and the visible representation of the action to be taken disappearing upon an execution of the action to be taken.

9. The user interface system of claim 8, wherein said visible representation of the voice-activated command comprises a textual representation of one or more words included within the voice-activated command, wherein the one of the plurality of different applications comprises a media player application, and wherein the visible representation of the action to be taken includes highlighting a media playback control.

10. The user interface system of claim 8, wherein providing a visible association comprises modifying display properties of one of, or the other of, or both of, the visible representation of a voice-activated command and the visible representation of action to be taken, wherein the one of the plurality of different applications comprises an application with file editing capabilities, and wherein the visible representation of the action to be taken includes opening a file menu.

11. A computer-implemented method for raising the visibility of a voice-activated user interface, the method comprising:

providing, on a display, a first user interface element that is associated with a first application and a second user interface element that is associated with a second application, the first and the second applications being different from one another;

providing, on the display, a textual representation of one or more words associated with a voice-activated command;

identifying one of the first and the second applications as a target application based at least in part upon a determination of which one of the first and the second applications that the voice-activated command is associated with;

utilizing a computer processor that is a component of a computing device to move the textual representation across the display towards the target application, the textual representation being moved utilizing different methods depending upon which one of the first and the second applications that it is associated with; and modifying display properties of the textual representation and of the target application to create an association between the textual representation and the target application.

12. The method of claim 11, wherein moving the textual representation comprises moving the textual representation along a corkscrew path to the target application, wherein the textual representation is associated with the first application, wherein the first application is a media player application, and wherein the textual representation is moved towards the media player application until it reaches a border of the media player application at which time the textual representation disappears.

13. The method of claim 11, wherein modifying the display properties comprises expanding the size of the textual representation, wherein the textual representation is associated with the second application, wherein the second application is a file editing application, and wherein the textual representation is moved towards the file editing application until it reaches a menu within the application and disappears.

14. The method of claim 11, wherein modifying the display properties comprises expanding a size of the target application, wherein the target application is a media player application, and wherein the textual representation corresponds to a function within the media player application.

15. The method of claim 11, wherein modifying the display properties comprises underlining the textual representation, wherein the target application includes file editing capabilities, and wherein the textual representation corresponds to one of several drop down file editing menus.

16. The method of claim 11, wherein modifying the display properties comprises underlining the target application, and wherein a third user interface element that is associated with a speech recognition application is provided simultaneously on the display along with the first and the second user interface elements.

17. The method of claim 11, wherein modifying the display properties comprises providing the textual representation with a glowing appearance, and wherein the textual representation is generated based at least in part by a speech recognition engine that digitizes and translates the voice-activated command.

18. The method of claim 11, wherein modifying the display properties comprises providing the target application with a glowing appearance, and wherein the textual representation includes words that are displayed without a border.

* * * * *